(12) United States Patent
Sasano et al.

(10) Patent No.: US 9,041,957 B2
(45) Date of Patent: May 26, 2015

(54) FACSIMILE APPARATUS, FACSIMILE SYSTEM, AND HOME GATEWAY

(71) Applicants: Kabushiki Kaisha Toshiba, Minato-ku, Tokyo (JP); Toshiba Tec Kabushiki Kaisha, Shinagawa-ku, Tokyo (JP)

(72) Inventors: Jun Sasano, Tokyo-to (JP); Tomohide Oka, Shizuoka-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 13/716,732

(22) Filed: Dec. 17, 2012

(65) Prior Publication Data

US 2013/0163042 A1    Jun. 27, 2013

Related U.S. Application Data

(60) Provisional application No. 61/580,392, filed on Dec. 27, 2011.

(51) Int. Cl.
*G06F 3/12* (2006.01)
*H04N 1/00* (2006.01)
*H04N 1/327* (2006.01)
*H04L 29/06* (2006.01)

(52) U.S. Cl.
CPC ............ *G06F 3/1296* (2013.01); *H04N 1/0022* (2013.01); *H04N 1/32704* (2013.01); *H04N 1/32708* (2013.01); *H04N 1/32719* (2013.01); *H04L 65/1006* (2013.01); *H04L 65/1069* (2013.01); *H04L 65/1036* (2013.01)

(58) Field of Classification Search
None
See application file for complete search history.

(56) References Cited

U.S. PATENT DOCUMENTS

| | | | | |
|---|---|---|---|---|
| 5,517,556 | A * | 5/1996 | Pounds et al. | 379/88.25 |
| 5,519,768 | A * | 5/1996 | Moquin et al. | 379/100.01 |
| 7,929,168 | B2 * | 4/2011 | Tanimoto | 358/1.15 |
| 7,933,047 | B2 * | 4/2011 | Nakagawa | 358/400 |
| 2003/0174685 | A1 * | 9/2003 | Hasebe | 370/338 |
| 2005/0110616 | A1 * | 5/2005 | Kajiwara | 340/286.01 |
| 2006/0067300 | A1 * | 3/2006 | Poustchi et al. | 370/352 |
| 2008/0240400 | A1 * | 10/2008 | Mairs et al. | 379/221.02 |
| 2010/0253962 | A1 * | 10/2010 | Higuchi et al. | 358/1.13 |
| 2010/0259788 | A1 * | 10/2010 | Sakuda et al. | 358/1.15 |
| 2012/0170081 | A1 * | 7/2012 | Tanaka | 358/407 |

FOREIGN PATENT DOCUMENTS

| | | |
|---|---|---|
| JP | 11-027450 | 1/1999 |
| JP | 2009-017580 | 1/2009 |

\* cited by examiner

*Primary Examiner* — Hilina K Demeter
(74) *Attorney, Agent, or Firm* — Amin, Turocy & Watson, LLP

(57) ABSTRACT

According to one embodiment, there is provided a facsimile apparatus connected to a home gateway, which is connected to an IP telephone network, via a communication line, the facsimile apparatus including a facsimile-signal detecting section configured to detect a facsimile identification signal in an incoming signal and a controller configured to instruct, when the facsimile identification signal is not detected in the incoming signal, using an SIP, the home gateway to perform a transfer operation for connecting a telephone set connected to the home gateway and a telephone set on an outgoing call side connected to the IP telephone network.

4 Claims, 5 Drawing Sheets

FACSIMILE APPARATUS, FACSIMILE SYSTEM, AND HOME GATEWAY

CROSS-REFERENCE TO RELATED APPLICATIONS

This application is based upon and claims the benefit of priority from U.S. Provisional Application No. 61/580,392 filed on Dec. 27, 2011; the entire contents of which are incorporated herein by reference.

FIELD

Embodiments described herein relate generally to a facsimile apparatus, a facsimile system, and a home gateway.

BACKGROUND

In recent years, according to the extensive spread of broadband of access networks in which an ADSL (Asymmetric Digital Subscriber Line), an FTTH (Fiber to The Home), and the like are used, a technique for performing communication using an IP (Internet Protocol) network called VoIP (Voice over IP) is developed.

On the other hand, the IETF (Internet Engineering Task Force), which is an Internet standardization organization, defines an SIP (Session Initiation Protocol). The SIP is a protocol that is being standardized as a technique for realizing real-time communication (e.g., IP telephone and video conference) on the IP network.

A facsimile apparatus is integrated with a telephone set. For example, a system for externally connecting the telephone set to the facsimile apparatus is adopted. A controller mounted on the facsimile apparatus determines an incoming signal and automatically switches a facsimile function and a telephone function.

Such a facsimile apparatus selects the facsimile function or the telephone function to perform exchange of a signal. Therefore, the facsimile apparatus may not be able to cause both the functions to simultaneously operate. In the facsimile apparatus connected to the IP telephone network to perform exchange of a signal according to the SIP, an interface function needs to be added between the facsimile apparatus and the telephone set, leading to an increase in costs.

DETAILED DESCRIPTION

The present invention has been devised in view of such circumstances and it is an object of the present invention to provide a facsimile apparatus that performs exchange of a signal according to the SIP, the facsimile apparatus being capable of causing a facsimile function and a telephone function to simultaneously operate and suppressing addition of an interface function for the telephone function, a facsimile system, and a home gateway.

In general, according to one embodiment, there is provided a facsimile apparatus connected to a home gateway, which is connected to an IP telephone network, via a communication line, the facsimile apparatus including: a facsimile-signal detecting section configured to detect a facsimile identification signal in an incoming signal; and a controller configured to instruct, when the facsimile identification signal is not detected in the incoming signal, using an SIP (Session Initiation Protocol), the home gateway to perform a transfer operation for connecting a telephone set connected to the home gateway and a telephone set on an outgoing call side connected to the IP telephone network.

Figure 1:
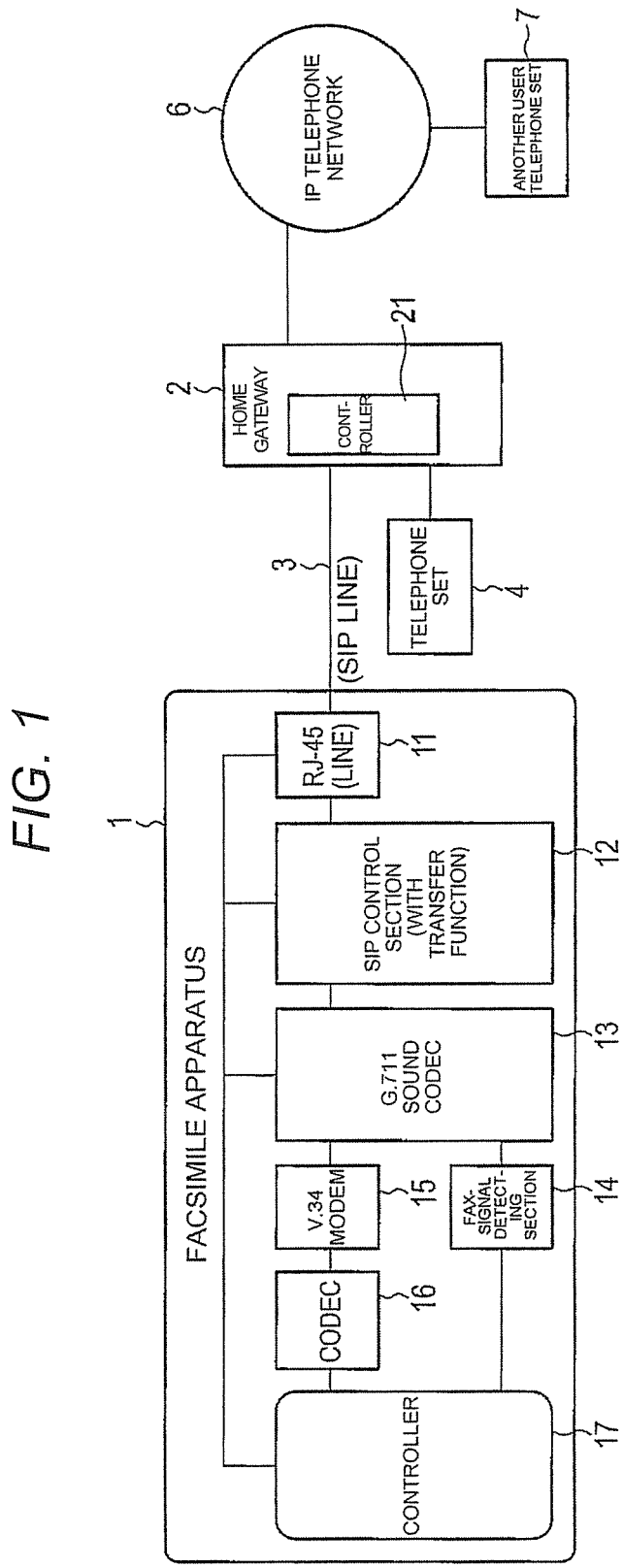
FIG. 1 is an exemplary diagram of the configuration of a facsimile system including a facsimile apparatus according to an embodiment.

FIG. 1 is an exemplary diagram of the configuration of a facsimile system including a facsimile apparatus according to an embodiment.

The facsimile system includes a facsimile apparatus 1, a home gateway (HGW) 2, and a communication line 3. The home gateway 2 is connected to an external IP telephone network 6 and connected to a telephone set 4 in a home. Another user telephone (including a facsimile function) 7 is connected to the IP telephone network 6.

The home gateway 2 connects the IP telephone network 6, which provides an IP telephone service, and the facsimile apparatus 1 via a communication line 3. The home gateway 2 and the facsimile apparatus 1 execute exchange of signals by an SIP. Therefore, the communication line 3 is hereinafter referred to as SIP line 3. The home gateway 2 is connected to the telephone set 4 to provide an IP telephone service via the IP telephone network 6. A controller 21 is provided in the home gateway 2. The controller 21 collectively controls the operation of the home gateway 2.

The facsimile apparatus 1 includes an RJ-45 terminal 11, an SIP control section 12, a G.711 sound codec 13, a facsimile-signal detecting section 14, a V.34 modem 15, a codec 16, and a controller 17.

The RJ-45 terminal 11 is a terminal for connecting the facsimile apparatus 1 to the SIP line 3. The SIP control section 12 is an interface between the facsimile apparatus 1 and the home gateway 2. The SIP control section 12 converts a signal level of a reception signal from the outside and captures the reception signal into the inside of the facsimile apparatus 1, converts a signal level of a transmission signal from the inside of the facsimile apparatus 1, and outputs the transmission signal to the home gateway 2. The SIP control section 12 has a transfer function for instructing the home gateway 2 to connect the other user telephone set 7 and the telephone set 4.

The G.711 sound codec 13 converts a digital signal input from the SIP line 3 into an analog signal. The facsimile-signal detecting section 14 determines whether a facsimile identification signal is included in the beginning of the input signal. The facsimile identification signal is a signal for notifying that a transmission side is a facsimile apparatus. When the transmission signal is a facsimile signal, the V.34 modem 15 outputs a signal to the codec 16. The codec 16 encodes and compresses the signal or decodes and expands the signal. The controller 17 collectively controls the operation of the facsimile apparatus 1.

Figure 2:
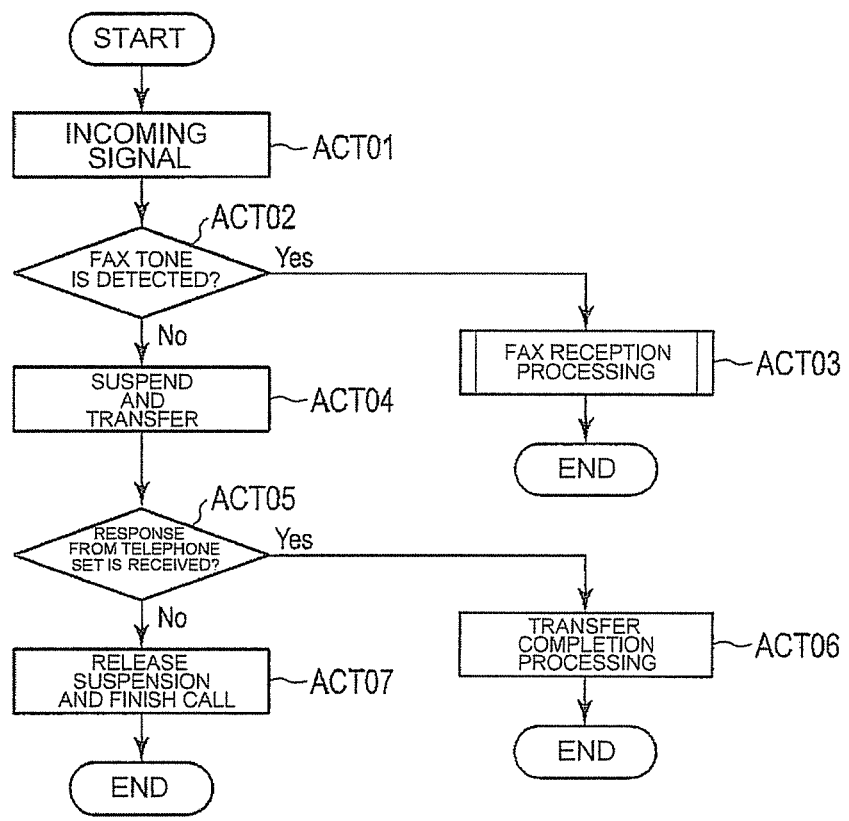
FIG. 2 is an exemplary flowchart for explaining an operation during signal reception of the facsimile apparatus according to the embodiment.

FIG. 2 is an exemplary flowchart for explaining an operation during signal reception of the facsimile apparatus according to this embodiment.

When an incoming signal is input to the home gateway 2 from the telephone set (the facsimile apparatus) 7 of another user via the IP telephone network 6, in Act 01, the incoming signal is received by the SIP control section 12 via the SIP line 3 and the RJ-45 terminal 11. The controller 17 responds to the incoming signal via the SIP control section 12 and connects a line.

When the transmission side is the facsimile apparatus, a CNG signal is sent. The CNG signal is a signal that repeats a tone of 1,100 Hz for 0.5 seconds and silence for 3 seconds after the tone. In Act 02, the controller 17 checks whether the facsimile-signal detecting section 14 detects a facsimile tone, i.e., the CNG signal.

If the facsimile-signal detecting section 14 detects a facsimile tone (YES in Act 02), in Act 03, the controller 17 executes facsimile reception processing. Specifically, the controller 17 sends a CED signal to the transmission side.

Subsequently, the controller 17 exchanges respectively implemented ability information between the transmission side and the reception side. Thereafter, the controller 17 receives image data transmitted according to a system using the V.34 modem 15 and the codec 16.

If the facsimile-transmission signal detecting section 14 fails to detect the CNG signal for a fixed period (NO in Act 02), the controller 17 determines that an originating side is a telephone set rather than a facsimile apparatus. In Act 04, the controller 17 holds a receiving operation and instructs, via the SIP control section 12, the home gateway 2 to perform a transfer call.

In Act 05, the controller 17 checks whether a response from the telephone set 4 is received via the home gateway 2. If a response from the telephone set 4 is received (YES in Act 05), in Act 06, the controller 17 executes transfer completion processing. Specifically, thereafter, the home gateway 2 executes connection processing between the originating side 7 and the telephone set 4. The facsimile apparatus 1 executes call finishing processing. Therefore, after the call finishing processing, the facsimile apparatus 1 can cope with reception of a new facsimile. Therefore, it is possible to cause the facsimile function and the telephone function to simultaneously operate.

If the controller 17 fails to detect a response from the telephone set 4 for a fixed period in response to the transfer call (NO in Act 05), in Act 07, the controller 17 releases the holded receiving operation and executes call finish processing such as disconnection of the line.

Figure 3:
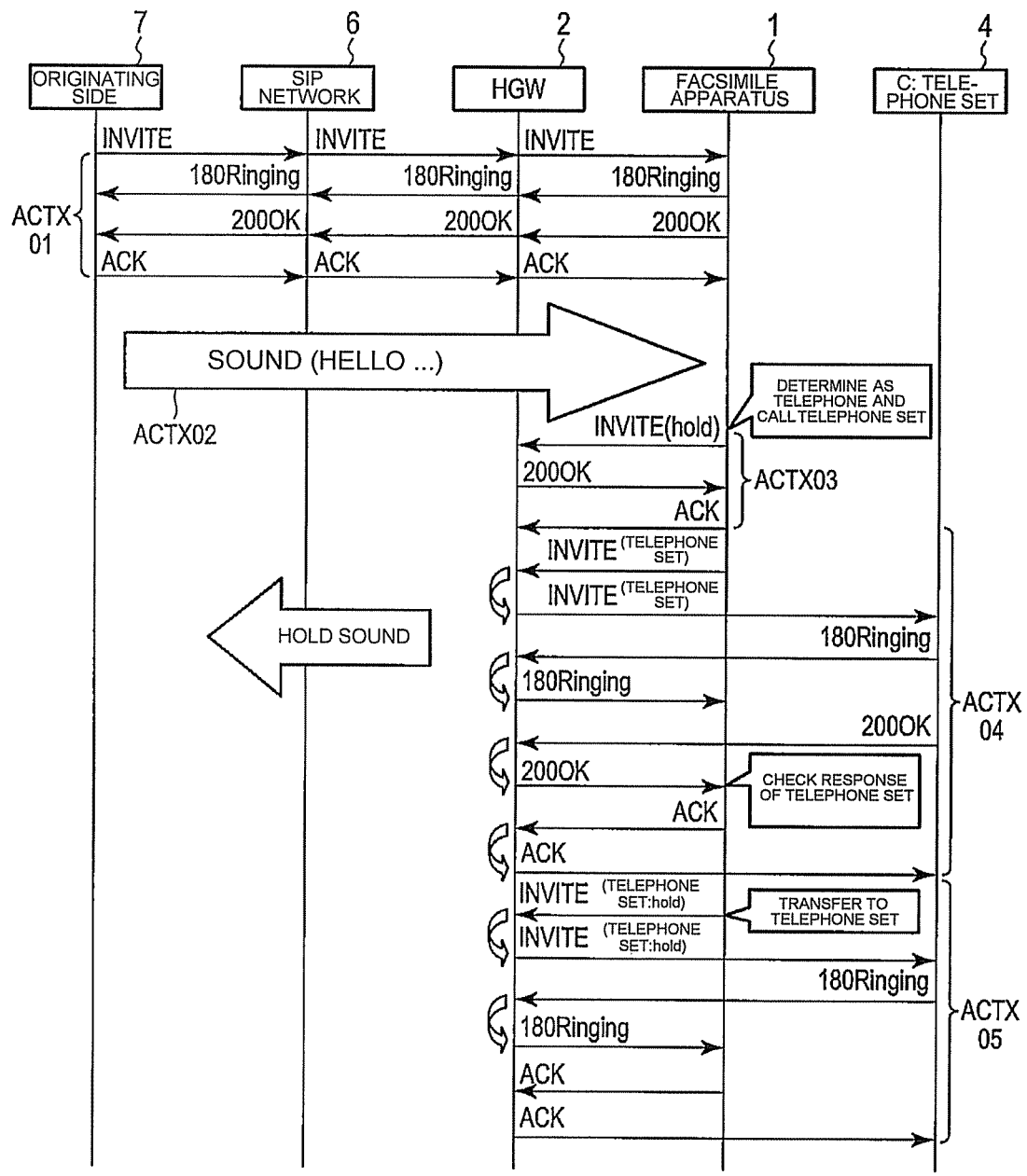
FIG. 3 is an exemplary diagram of a detailed signal exchange procedure by an SIP in a facsimile system according to the embodiment.
Figure 4:
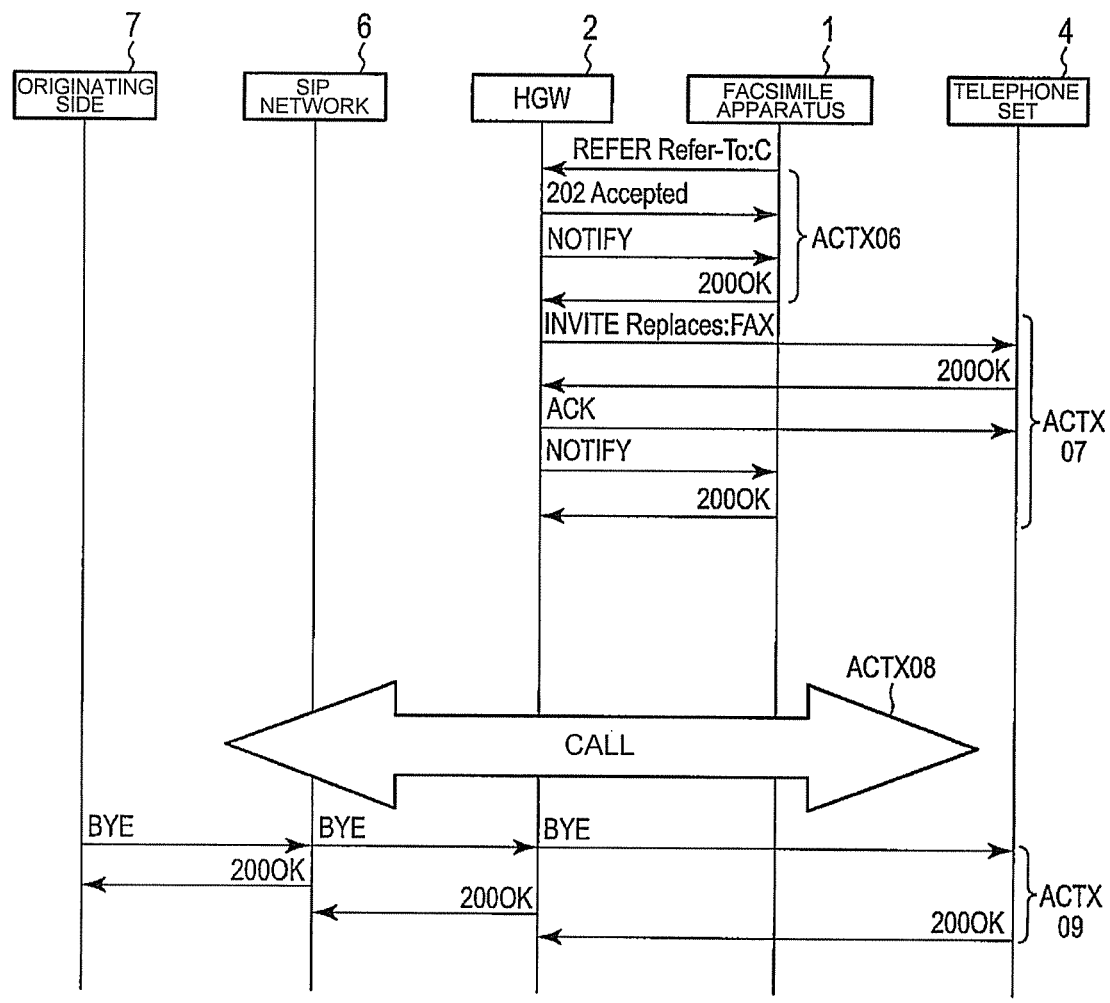
FIG. 4 is an exemplary diagram of the detailed signal exchange procedure by the SIP in the facsimile system according to the embodiment.

FIGS. 3 and 4 are exemplary diagrams of a detailed signal exchange procedure by the SIP in the facsimile system according to this embodiment. In FIG. 2, the reference numerals are described as Acts 01, 02, and the like. In FIGS. 3 and 4, in order to distinguish reference numerals from the reference numerals in FIG. 2, the reference numerals are described as Acts X01, X02, and the like.

In FIGS. 3 and 4, an SIP sequence among the facsimile apparatus 1, the home gateway 2, the telephone set (C) 4, the IP telephone network (an SIP network) 6, and the other user telephone set (the originating side) 7 is shown.

(1) In Act X01, an SIP sequence of an incoming signal is shown. The originating side 7 outputs "INVITE" of an SIP method in order to establish a session. The "INVITE" is transmitted to the facsimile apparatus 1 via the IP telephone network 6 and the home gateway 2. The facsimile apparatus 1 transmits, to the originating side, a provisional response "180 Ringing" indicating that the "INVITE" is received and processing of the "INVITE" is being executed. After the processing ends, the facsimile apparatus 1 transmits, to the originating side, a success response "200 OK" indicating that request processing is successful. The originating side 7 that receives the success response "200 OK" transmits, to the facsimile apparatus 1, "ACK" indicating that the session establishment is confirmed.

(2) In Act X02, sound by the telephone set is transmitted from the originating side 7. Since a CNG signal is not detected as explained above, the facsimile apparatus 1 determines that the originating side 7 is the telephone set.

(3) In Act X03, session establishment is performed between the facsimile apparatus 1 and the home gateway 2. The facsimile apparatus 1 outputs the "INVITE" in order to establish a session. The home gateway 2 transmits the success response "200 OK" to the facsimile apparatus 1. The facsimile apparatus 1 transmits, to the home gateway 2, the "ACK" indicating that the session establishment is confirmed.

(4) In Act X04, the facsimile apparatus 1 checks whether the telephone set 4 is capable of responding. The facsimile apparatus 1 outputs the "INVITE" to the telephone set 4 via the home gateway 2. In response to the "INVITE", the telephone set 4 transmits the provisional response "180 Ringing" and the success response "200 OK" to the facsimile apparatus 1 via the home gateway 2. Consequently, the facsimile apparatus 1 confirms that the telephone set 4 is capable of responding. The facsimile apparatus 1 transmits the "ACK" to the telephone set 4.

(5) In Act X05, the facsimile apparatus 1 sets the telephone set 4 in a holding state. The facsimile apparatus 1 outputs "INVITE (telephone set: hold)" to the telephone set 4 via the home gateway 2. In response to the "INVITE (telephone set: hold)", the telephone set 4 transmits the provisional response "180 Ringing" to the facsimile apparatus 1 via the home gateway 2. The facsimile apparatus 1 transmits the "ACK" to the telephone set 4.

(6) In Act X06, the facsimile apparatus 1 instructs the home gateway 2 to transfer the call to the telephone set (C) 4. The facsimile apparatus 1 transmits a transfer instruction "REFER (Refer to C (telephone set))" to the home gateway 2. The home gateway 2 transmits, to the facsimile apparatus 1, a success response "202 Accepted" and "NOTIFY" representing a transfer state. The facsimile apparatus 1 transmits the success response "200 OK" to the home gateway 2.

(7) In Act X07, the home gateway 2 instructs the telephone set 4 to respond to the call. The home gateway 2 transmits, to the telephone set 4, "INVITE (Replaces: FAX)" representing that the home gateway 2 replaces the facsimile apparatus 1. The telephone set 4 transmits the success response "200 OK" to the home gateway 2. The home gateway 2 transmits the "ACK" to the telephone set 4. The home gateway 2 transmits, to the facsimile apparatus 1, the "NOTIFY" representing a transfer state. The facsimile apparatus 1 transmits the success response "200 OK" to the home gateway 2.

(8) In Act X08, a call is performed between the other user telephone set 7 and the telephone set 4. In this state, the facsimile apparatus 1 is not involved in the action of the call.

(9) In Act X09, processing for finishing the call is executed. The originating side 7 transmits "BYE" indicating the end to the telephone set 4 via the IP telephone network 6 and the home gateway 2. The telephone set 4 transmits the success response "200 OK" to the originating side 7.

A configuration in which the facsimile apparatus 1 includes a function of switching facsimile and telephone is explained.

Figure 5:
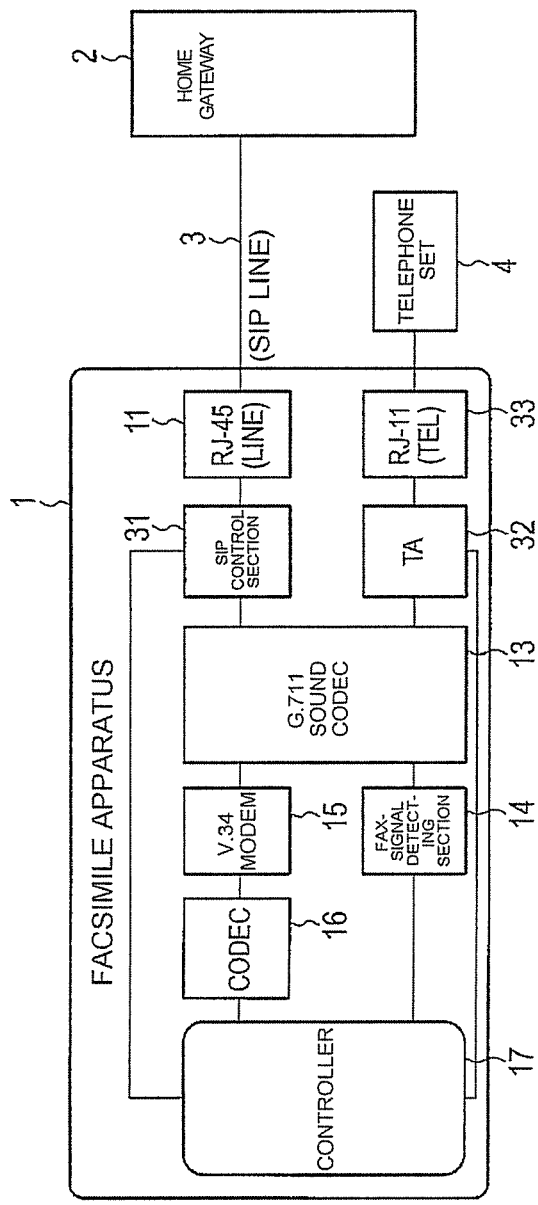
FIG. 5 is an exemplary diagram of the configuration of another facsimile apparatus compared with the facsimile apparatus according to the embodiment.

FIG. 5 is an exemplary diagram of the configuration of another facsimile apparatus 30 compared with the facsimile apparatus 1 according to this embodiment.

The facsimile apparatus 30 shown in FIG. 5 is configured to be connectable to the home gateway 2 via the SIP line 3 and further configured to be connectable to the telephone set 4. The facsimile apparatus 30 includes the RJ-45 terminal 11, an SIP control section 31, the G.711 sound codec 13, the facsimile-signal detecting section 14, the V.34 modem 15, the codec 16, a terminal adapter (TA) 32, an RJ-11 terminal 33, and the controller 17.

The facsimile apparatus 30 shown in FIG. 5 is different from the facsimile apparatus 1 shown in FIG. 1 in a function of the SIP control section 31 and in that the terminal adapter 32 and the RJ-11 terminal 33 are provided anew. Since the other components are the same as the components of the facsimile apparatus 1 shown in FIG. 1, detailed explanation of the components is omitted.

The SIP control section 31 is an interface between the facsimile apparatus 30 and the home gateway 2. The SIP control section 31 converts a signal level of a reception signal from the outside and captures the reception signal into the inside of the facsimile apparatus 30, converts a signal level of a transmission signal from the inside of the facsimile apparatus 30, and outputs the transmission signal to the home gateway 2. However, the SIP control section 31 does not include a transfer function. The RJ-11 terminal 11 is a terminal for connecting the facsimile apparatus 30 to the telephone set 4. The terminal adapter 32 executes call control and outgoing and incoming control for the telephone set 4 according to an instruction from the controller 17.

As it is evident from the comparison with the other facsimile apparatus 30, in the facsimile apparatus 1 according to this embodiment, it is unnecessary to incorporate a terminal adapter for an external telephone set in order to connect the telephone set to the home gateway 2. Therefore, in the facsimile apparatus 1 according to this embodiment, it is possible to cause the facsimile function and the telephone function to simultaneously operate. It is possible to suppress addition of an interface function for the telephone function.

The telephone set 4 connected to the home gateway 2 may be an IP telephone or may be an analog telephone.

The telephone set connected to the home gateway 2 is not limited to one telephone set. A plurality of telephone sets may be connected to the home gateway 2. The facsimile apparatus 1 can connect a specific telephone set and another user telephone by designating telephone sets to which a call is transferred among the plurality of telephones.

The functions explained in the embodiment may be configured using hardware. A computer program describing the functions using software may be realized by causing a computer to read the computer program. The functions may be configured by selecting software or hardware as appropriate.

Further, the functions can also be realized by causing the computer to read the computer program stored in a not-shown recording medium. A recording form of the recording medium in this embodiment may be any form as long as the recording medium can record the computer program and is readable by the computer.

The present invention is not limited to the embodiment per se. At an implementation stage, the constituent elements can be modified and embodied without departing from the spirit of the present invention.

Various inventions can be formed by appropriate combination of the plurality of constituent elements described in the embodiment. For example, several constituent elements may be deleted from all the constituent elements described in the embodiment. Further, the constituent elements described in different embodiments may be combined as appropriate.

What is claimed is:

1. A facsimile apparatus connected, via a communication line, to a home gateway which is connected to an IP telephone network and a first telephone set of a stand-alone type, the facsimile apparatus comprising:
   a determining section configured, in response to occurrence of a receiving call, to determine whether the call is originated by a facsimile apparatus different from the facsimile apparatus connected to the home gateway via the communication line or a second telephone set; and
   a controller configured to:
      execute facsimile reception processing when the determining section determines that the call is originated by the originating facsimile apparatus;
      hold the receiving call and instruct, when the determining section determines that the call is originated by the second telephone set, using an SIP (Session Initiation Protocol), the home gateway to perform a transfer operation for connecting the first telephone set and the second telephone set;
      execute call finishing processing after the transfer operation has been completed; and
   shift to a state of waiting for a new receiving call after the call finishing processing has been completed.

2. The apparatus according to claim 1, wherein
the home gateway is configured to be capable of connecting a plurality of first telephone sets, and
the controller instructs, using the SIP, the home gateway to perform the transfer operation for connecting an arbitrary first telephone set among the plurality of first telephone sets and the second telephone set.

3. A facsimile system comprising:
a home gateway connected to an IP telephone network and a first telephone set of a stand-alone type;
a facsimile apparatus configured to communicate with the home gateway via a communication line using an SIP (Session Initiation Protocol);
wherein the facsimile apparatus includes:
   a facsimile signal detecting determining section configured, in response to occurrence of a receiving call, to determine whether the call is originated by a facsimile apparatus different from the facsimile apparatus that communicates with the home gateway via the communication line, or a second telephone set; and
   a first controller configured to:
      hold a received call and instruct when the determining section determines that the call is originated by the second telephone set, using the SIP, the home gateway to perform a transfer operation;
      execute call finishing processing after the transfer operation has been completed; and
      shift to a state of waiting for a new receiving call after the call finishing processing has been completed; and
the home gateway includes another controller configured to execute the transfer operation for connecting the first telephone set and the second telephone set in response to the instruction.

4. The system according to claim 3, wherein
the home gateway is configured to be capable of connecting a plurality of telephone sets, and
the controller instructs, using the SIP, the home gateway to perform the transfer operation for connecting an arbitrary first telephone set among the plurality of first telephone sets and the second telephone set.

* * * * *